US012799869B2

(12) United States Patent
Naryzhnyy et al.

(10) Patent No.: US 12,799,869 B2
(45) Date of Patent: Nov. 17, 2026

(54) TURBINE VANE FOR A GAS TURBINE

(71) Applicant: Siemens Energy Global GmbH & Co. KG, Munich (DE)

(72) Inventors: Oleg Naryzhnyy, Finspång (SE); Petr Laletin, Finspang (SE); Evgenii Rusetskii, Moscow (RU)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 19/103,612

(22) PCT Filed: Aug. 17, 2023

(86) PCT No.: PCT/EP2023/072707
§ 371 (c)(1),
(2) Date: Feb. 13, 2025

(87) PCT Pub. No.: WO2024/041970
PCT Pub. Date: Feb. 29, 2024

(65) Prior Publication Data

US 2026/0055708 A1 Feb. 26, 2026

(30) Foreign Application Priority Data

Aug. 24, 2022 (GB) ...................................... 2212293

(51) Int. Cl.
*F01D 5/18* (2006.01)
*F01D 9/06* (2006.01)

(52) U.S. Cl.
CPC ............. *F01D 5/187* (2013.01); *F01D 9/065* (2013.01); *F05D 2260/20* (2013.01); *F05D 2260/607* (2013.01)

(58) Field of Classification Search
CPC .......... F01D 5/187; F01D 9/065; F01D 25/32; B04C 5/00; B04C 5/12; B01D 45/12; F05D 2260/607
See application file for complete search history.

(56) References Cited

U.S. PATENT DOCUMENTS 4,383,854 A 5/1983 Dembowski et al.
5,394,687 A 3/1995 Chen et al.
(Continued)

FOREIGN PATENT DOCUMENTS

DE 102018205721 A1 10/2019
EP 1101900 A1 5/2001
(Continued)

OTHER PUBLICATIONS

GB Office Action; Application No. GB2212293.1; Filing Date: Aug. 24, 2022; Date of mailing: Jan. 30, 2023; 7 pages.
(Continued)

*Primary Examiner* — Justin D Seabe
(74) *Attorney, Agent, or Firm* — CANTOR COLBURN LLP; Norbert Dietzen

(57) ABSTRACT

A turbine vane (TV) for a gas turbine includes an airfoil (AF) with a suction side wall (SSW) and a pressure side wall (PSW) that form a central cavity (CC). These walls extend axially from a leading edge (LE) to a trailing edge (TE) and radially from an outer end (OE) to an inner end (IE). The vane features outer and inner platforms (OP, IP) with hot and cold gas surfaces. Cooling channels (CMC) are arranged in the SSW and/or PSW, extending radially with inlets and outlets connected to coolant supply and discharge chambers. The channels are configured so adjacent channels have opposite flow directions, reducing the risk of plugging by particles. A bypass channel (BC) connects two adjacent cooling channels to mitigate clogging. The vane may include
(Continued)

a dust precipitator (DP) with an air acceleration zone (AAZ), dust inertia separator (DIS), and dust trap (DT).

13 Claims, 4 Drawing Sheets

(56) References Cited

U.S. PATENT DOCUMENTS

| | | | | |
|---|---|---|---|---|
| 6,478,535 | B1 | 11/2002 | Chung et al. | |
| 8,414,263 | B1 * | 4/2013 | Liang | F01D 5/187 416/97 R |
| 8,517,667 | B1 * | 8/2013 | Liang | F01D 5/187 415/115 |
| 2002/0164250 | A1 | 11/2002 | Chung et al. | |
| 2005/0244264 | A1 * | 11/2005 | Jacks | F01D 5/187 415/115 |
| 2011/0067409 | A1 | 3/2011 | Beeck | |
| 2020/0300114 | A1 * | 9/2020 | Osgood | F01D 25/12 |

FOREIGN PATENT DOCUMENTS

| | | | |
|---|---|---|---|
| EP | 3156598 | A1 | 4/2017 |
| EP | 3176371 | A1 | 6/2017 |
| EP | 3199761 | A1 | 8/2017 |
| EP | 3674519 | A1 | 7/2020 |
| JP | 2015038358 | A | 2/2015 |
| WO | 2024041970 | A1 | 2/2024 |

OTHER PUBLICATIONS

PCT International Search Report and Written Opinion of International Searching Authority mailed Oct. 11, 2023 corresponding to PCT International Application No. PCT/EP2023/072707 filed Aug. 17, 2023; 16 pages.

PCT Preliminary Report on Patentability dated Jul. 29, 2024 corresponding to PCT International Application No. PCT/EP2023/072707 filed Aug. 17, 2023; 29 pages.

* cited by examiner

TURBINE VANE FOR A GAS TURBINE

BACKGROUND

The invention relates to a turbine vane comprising:

an airfoil for guiding a hot gas of the gas turbine, an outer platform and an inner platform, a number of cooling channels that are arranged in the suction side wall and/or the pressure side wall, the cooling channels extends, when the vane is mounted in a gas turbine, along its radial direction, wherein each cooling channel has at least one channel inlet and one channel outlet through which a coolant can enter resp. leave the respective cooling channel, the channel inlets are in flow connection with least one coolant supply chamber and the channel outlets are in flow connection with least one coolant discharge chamber.

A turbine vane as mentioned above is known from U.S. Pat. No. 5,394,687 and EP 1 101 900 A1. In accordance with EP 1 101 900 A1, those radially extending cooling channels are either casted or drilled. The usage of casting cores for the manufacturing of radial cooling channels is quite complex and leads to a remarkably high scrap rate. Hence, the implementations of such a cooling design in turbine components are limited by conventional methods like investment castings. Drilling of said cooling holes is limited to airfoils having a straight configuration in radial direction, which is nowadays the exception than the standard. Modern airfoils of turbine vanes comprise 3D shaped airfoil designs, with bow, sweeps and the like, where drilling is not an option for the manufacturing of so-called near wall airfoil cooling holes.

Next, U.S. Pat. No. 8,517,667 B1, U.S. Pat. No. 8,414,263 B1 and US 2002/0164250 A1 dis-close a set of spanwise parallel extending cooling channels within an airfoil. The cooling channel set enables a counter air flow arrangement in adjacent channels which leads to a more uniform metal temperature for the airfoil walls with less thermally induced stress.

Further, US 2020/300114 A1 discloses a turbine vane comprising a cyclone separator in its outer band for removing particles from the cooling air. In contrast to this, JP 2015-38358 A propose to move the cyclone separator out of the vane into the casing, which car-ries the vane.

Further, it is also known to apply impingement cooling sheets in the interior of turbine vanes to achieve high cooling effects. Those and other modular designs of turbine vanes however required the manufacturing of additional elements and a subsequent joining process, which decreases reliabilities and increases costs.

EP 1 101 900 A1 teaches to have multiple axial regions with synchronized cooling flow directions, i.e., the flow directions in multiple adjacent cooling bores are identical and changes only from region to region, each region comprising several cooling bores.

Hence, a turbine vane is needed that overcomes the drawbacks of the prior art: the cooling scheme of the turbine vane must reliably enable highest hot gas temperatures without shortening the lifetime of the turbine vane, also when manufactured by additive manufacturing methods.

It is an objective of the invention to provide an advantageous turbine vane, which is easy to manufacture, and which allows an increase of the hot gas temperature and/or the increase of operational lifetime of the turbine vane.

SUMMARY

The problem is solved with a turbine vane according to the features of the independent claim. Advantageously embodiments are subject of dependent subclaims and of the following description. Their individual features can be combined arbitrarily, if not otherwise stipu-lated.

In detail, the problem is solved by a turbine vane for a gas turbine, comprising an airfoil having a suction side wall and a pressure side wall encompassing at least one central cavity, both walls extending, when the turbine vane is assembled in a gas turbine, in axial direction of said gas turbine from a leading edge to a trailing edge and in radial direction of said gas turbine from an outer end of the airfoil to an inner end of the airfoil, for guiding a hot gas of the gas turbine, an outer platform and an inner platform, each located at the respective end of the airfoil and each having a hot gas surface facing towards the airfoil and an internal cold gas surface that is opposingly arranged to the hot gas surface, a number of cooling channels that are arranged in the suction side wall and/or the pressure side wall, the cooling channels extends substantially in radial direction, wherein each cooling channel has at least one channel inlet and one channel outlet through which a coolant can enter resp. leave the respective cooling channel, wherein for the respective cooling channel its first channel inlet of the at least one channel inlets is in flow connection with one of the least one coolant supply chambers and its channel outlet is in flow connection with one of the at least one coolant discharge chambers, wherein the first channel inlets and the channel outlets of the number of cooling channels are arranged such, that for a substantial number of the cooling channels, preferably for all cooling channels the flow directions of direct adjacent cooling channels are opposite.

In other words: for almost all or for all of the radially extending cooling channels located in the airfoil walls the flow directions of the direct adjacent cooling channel are opposite and with that alternating from cooling channel to cooling channel.

The inventor recognizes that the inventive airfoil counterflow cooling scheme is more beneficial than the cooling scheme known from EP 1 101 109 A1, in which larger regions with multiple cooling bores having the same flow directions. While flowing along the cooling bores, the coolants is heated up and leaves the respective cooling bores heated. The cooling schemes of the prior art leads to an unbalanced temperature distribution in radial direction: at the supply end the cooling effect is larger than at the airfoil end, where the coolant, e.g., cooling air, exits the airfoil. By repeatedly altering the flow direction of coolant from cooling channel to cooling channel the cooling impact as seen in radial direction is equalized, e.g., lower temperature gradients in the airfoil walls, the ratio between the maximum metal temperature and the average value decreases. With that, higher hot gas temperatures can be achieved and/or higher turbine vane lifetime. In other words: The advantage of this airfoil counterflow cooling scheme is the plain design of its implementation of and its result of a more uniform airfoil metal temperature field.

Another advantage of the proposed airfoil counterflow cooling scheme is that the outer shape of the airfoil can be freely adapted to the aerodynamical requirements without any limitation to heat transfer and cooling, especially when the turbine vane is additively manufactured. The cooling channels are predominantly of straight configuration starting at the outer end and finishing at the inner end, or vice versa, but in lateral direction they can follow the hot gas surface of the airfoil with constant distance.

Further, at least one means is provided for reducing the risk of and/or resulting from plugging the cooling channels by particles. Providing such a means within a turbine blade increase its lifetime and ensure safe operation of a gas turbine, when equipped with such a turbine vane. By incorporating the means for reducing the risk and/or resulting from plugging the cooling channels by particles directly into the part itself an additional element for this purpose is introduced, without changing other elements of the gas turbine. Already existing constructions for cleaning the (cooling) air, like particle filters located in air intake system or in the interior of the gas turbine remain unchanged.

In detail the means is embodied as a bypass channel, connecting fluidly two cooling channels having their first channels inlet direct next to each other. Depending on the number of bypass channels ending in the respective cooling channel, the respective cooling channel comprises one or two second channel inlets for coolant. In case that larger particles, which are carried with the coolant, e.g., cooling air, may plugs the channel inlet, coolant can be fed to the corre-sponding cooling channel through the bypass channel. This increases the failsafe capability, the du-rability and useful life of the turbine vane.

In one embodiment of the invention the at least one coolant supply chamber is partially limited by the internal cold gas surfaces of the inner platform or by the internal cold gas surfaces of the outer platform and the at least one coolant discharge chamber is embodied as the at least one central cavity. This design is simple, robust and enables a compact turbine vane.

For repeatedly altering the flow direction of coolant from channel to adjacent channel the first channel inlets of each second cooling channel are arranged in the internal cold gas surface of the outer platform and the first channel inlets of the alternating cooling channels located between two of each second cooling channels are arranged in the internal cold gas surface of the inner platform and wherein the channel outlets of each second cooling channel are arranged at the inner end of the airfoil and the channel outlets of the alternating cooling channels located between two of each second cooling channels are arranged at the outer end of the airfoil.

According to another embodiment almost all or all of the cooling channels located along the suction side wall and around the leading edge are—in cross section—elliptical or egg-shaped with a first average pitch therebetween and/or almost all or all of the cooling channels located in the pressure side wall are—in cross section—circular with a second average pitch therebetween, wherein preferably the first average pitch is smaller than the second average pitch. Here, the shapes of the colling channels are adapted to the local needs regarding heat transfer, mechanical integrity, and turbine vane lifetime.

To establish enhanced trailing edge cooling of the airfoil and an efficient discharge of coolant out of the airfoil the airfoil comprises at least one discharge cooling hole at or in the trailing edge, and wherein between the at least one coolant discharge chamber and the at least one discharge cooling hole an array of cooling pins and/or axially extending stiffening ribs are/is arranged.

In one embodiment, the axial length of the airfoil is determined between its leading edge and trailing edge, and wherein the airfoil is free of film cooling holes in at least 85% of its axial length starting from its leading edge. Not to mention that by omitting film cool hole drilling the manufacturing process is significantly easier, in operation of the inventive turbine vane no aero mixing loses appear. Further, the needed amount of coolant can be reduced by about 40% compared to a turbine vane having leading edge, suction side, and/or pressure side film cooling. Besides this, having no film cooling, the coolant supply pressure can be reduced as the needed discharge pressure of coolant including a backflow margin is defined by the hot gas pressure at the trailing edge of the airfoil and not, when film cooling is applied, at airfoil's leading edge. Either the saving of coolant pressure can be used for efficiency increase and/or for the introduction of an additional anti-clogging systems, e.g., a dust precipitator embedded in the turbine vane.

To provide a compact turbine vane the inner platform and/or the outer platform each are encompassing the respective coolant supply chamber. This turbine vane structure is beneficially manufacturable with aid of additive manufacturing methods, in particular by laser-assisted powder-bed fusion (LPDF).

In one embodiment, the coolant discharge chamber is separated from the coolant supply chamber by a separation wall. With that, the stiffness of the region where the airfoil joins the platform can be increased.

In one embodiment, the means is embodied as a dust precipitator, which is arranged in the inner platform and/or the outer platform. An analysis has shown a high efficiency of the dust precipitator by removing about 90% of particles up to 1 mm in size. The dust precipitator removes at least the majority, or nearly all dust particles carried by the coolant before the cleaned coolant is guided to the cooling channel for cooling the airfoil. The supply of cleaned coolant enables smaller cross sections for the cooling channels with lower risk of blocking by sticking particles therein. With that, the lifetime of the turbine vane can be increased and/or further improved cooling by further reduced pitch of the cooling channels can be achieved.

In one embodiment of the dust precipitator, the dust inertia separator is a pipe with multiple clean coolant exit holes and extending in the same direction to which the coolant leaves the air acceleration zone. Neither reworking nor additional parts are needed. As the dust separation system is integrated into the platform the dimension of the inventive turbine vane goes not beyond the dimensions of existing parts. With that, a retrofittable inventive turbine vane can be provided.

In one embodiment, the turbine vane is monolithic and manufactured by an additively manufacturing process, which preferably is a powder-bed fusion process, in particular a laser-assisted powder-bed fusion process (LPBF).

The previously given description of advantageous embodiments of the invention contains numerous features which are partially combined with one another in the dependent claims. Expediently, these features can also be considered individually and be combined with one another into further suitable combinations. Furthermore, features of the method, formulated as apparatus features, may be considered as features of the assembly and, accordingly, features of the assembly, formulated as process features, may be considered as features of the method.

The above-described characteristics, features and advantages of the invention and the way they are achieved can be understood more clearly in connection with the following description of exemplary embodiments which will be explained with reference to the drawings. The exemplary embodiments are intended to illustrate the invention but are not supposed to restrict the scope of the invention to combinations of features given therein, neither regarding functional features. Furthermore, suitable features of each of the exemplary embodiments can also be explic-itly considered in isolation, be removed from one of the exemplary embodiments, be introduced into another of the exemplary embodiments and/or be combined with any of the appended claims.

BRIEF DESCRIPTION OF THE DRAWINGS

The present invention will be described with reference to drawings in which.

DETAILED DESCRIPTION

Figure 1:
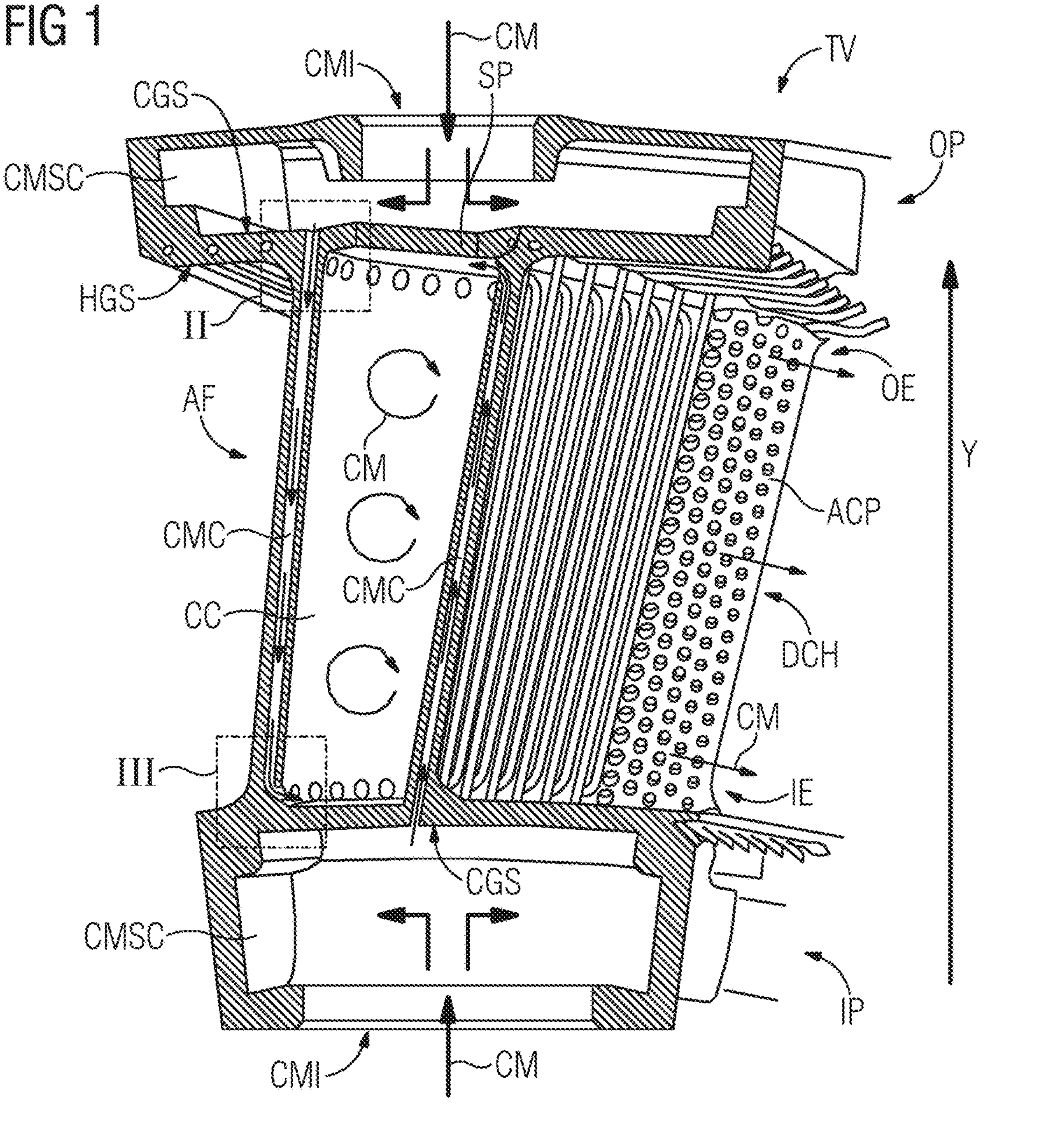
FIG. 1 shows a cross-sectional view of a turbine vane according to a first exemplary embodiment of the invention.

FIG. 1 shows a turbine vane TV for a gas turbine in a cross-sectional view. The turbine vane TV is manufactured by an additive manufacturing process like laser-assisted pow-der-bed fusion (LPBF) and therefore embodied as a monolithic piece.

Figure 3:
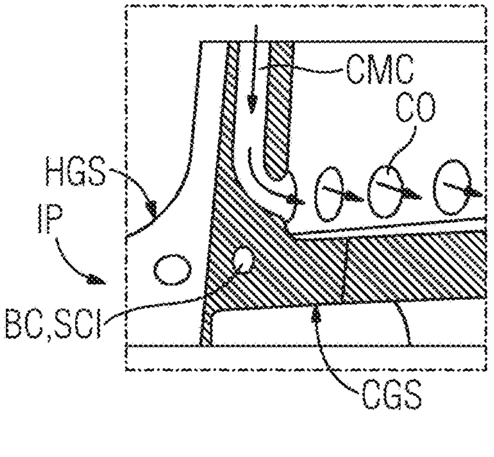
FIG. 3 shows a first detail of FIG. 1 wrt, the inner end of the airfoil of the turbine vane.
Figure 4:
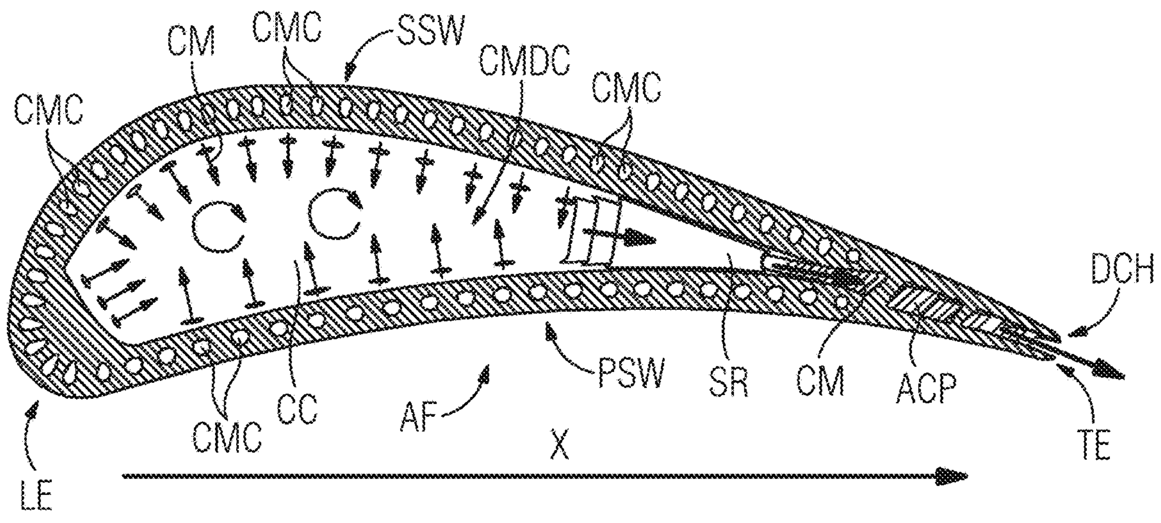
FIG. 4 shows a cross sectional view through the airfoil of the turbine vane shown in FIG. 1.

The turbine TV comprises as main body an airfoil AF, which is aerody-namically shaped (cf. FIG. 3) as a bowed tear drop. When the turbine vane TV is assembled in a gas turbine, the airfoil AF and more precise, its suction side wall SSW and its pressure side wall PSW extends in radial direction Y of said gas turbine from an outer end OE to an inner end IE. The two walls SSW and PSW also extents in axial direction of said gas turbine from a leading edge LE of the airfoil AF to a trailing edge TE. During operation of the gas turbine the airfoil AF is subjected to a hot gas medium driving the gas turbine.

At the outer end OE and the inner end IE of the airfoil AF an outer platform OP resp. an inner platform IP are arranged. Each platform IP, OP is hollow and encompasses a coolant supply chamber CMSC. According to the exemplary embodiment shown, on that side of the platform, which is opposite to the airfoil AF each platform IP, OP comprises a coolant vane inlet CMI being in flow connection with the coolant supply chamber CMSC. The displayed turbine vane TV comprises two coolant vane inlets CMI. With that, the outer platform OP and the inner platform IP are of a double wall configuration, wherein each platform comprises a hot gas surface HGS facing towards the airfoil AF and an internal cold gas surface CGS that is opposingly arranged to the hot gas surface HGS.

A number of cooling channels CMC are arranged in the airfoil AF. They extent predominantly in a straight manner from the inner end IE to the outer end OE, or vice versa, and are distributed along a major part of the circumference of the airfoil (cf. FIG. 3) in the suction side wall SSW, at the leading edge and/or in pressure side wall PSW of the airfoil. Each of these cooling channels CMC has at least one channel inlet CI and one channel outlet CO. According to the exemplary embodiment shown in FIG. 3 each of the cooling channels CMC has only one channel inlet CI, the first channel inlet FCI.

Figure 2:
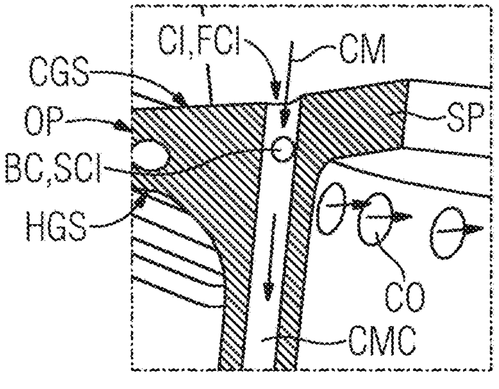
FIG. 2 shows a first detail of FIG. 1 wrt, the outer end of the airfoil of the turbine vane.

The first channels inlets FCI are located in the internal cold gas surface CGS of the platforms IP, OP such, that coolant supply chamber CMSC is in flow connection with first channel inlets FCI (cf. FIG. 2). The channel outlets CO are arranged in the inner surface of the airfoil AF, either in the vicinity of the outer platform OP or in the vicinity of the of inner platform IP. All cooling channels CMC of the airfoil AF are arranged under small distance, approx. 1 mm, to the airfoil hot gas surface.

The first channel inlet FCI and channel outlet CO of two direct adjacent cooling channels CMC are arranged such, that the direction of flow of coolant in the two respective cooling channels are opposite. Hence each second cooling channel guides coolant from the outer end OE of the airfoil AF to its inner end IE and the remaining, i.e., the alternating cooling channels CMC from the inner end IE of the airfoil AF to its outer end OE.

All channel outlets CO of the airfoil's cooling channels CMC are in flow connection with the at least one coolant discharge chamber CMDC. Between the at least one central cavity CC and the trailing edge TE a series of radially distributed stiffening ribs SR and an array of cooling pins ACP are arranged. The trailing edge comprises at least one coolant discharge cooling hole DCH, e.g., as centerline bleed discharge hole. Alternatively, the turbine vane TV resp. its airfoil AF can comprises in the trailing edge TE a number of discharge cooling holes DCH. When located near or at to the trailing edge, the number of discharge cooling holes DCH could be embodied as cut-back openings (not shown). Each stiffening rib SR connects the suction side wall SSW and the pressure side wall PSW and extends in axial direction X for guiding the coolant from the coolant discharge chamber CMDC in an appropriate manner to the array of cooling pins ACP.

According to the first exemplary embodiment shown in FIGS. 1, 2, 3 and 4, the central chamber CC is the coolant discharge chamber CMDC. With that, the central chamber CC are separated from the cooling medium supply chambers CMSC by separation walls SW for each respective platform IP, OP. In this case, the turbine vane comprises two coolant inlets CMI, one at the outer platform OP and one at the inner platform IP.

The separation wall SP separates also the first channel inlet FCI of a first cooling channel CMC from the channel outlet CO of a second cooling channel CMC, which is directly adjacent to the first cooling channel CMC.

According to an alternative embodiment of the invention, which is not shown, the turbine TV can comprise only one coolant vane inlet CMI, either at its inner platform IP or at its outer platform IP. In this case, the airfoil AF can comprise two central cavities, of which the first is embodied as cooling discharge chamber CMDC and of which the second is embodied as a radially extending tube for guiding yet unused coolant to the opposite end of the turbine vane TV, where no coolant vane inlet exists. Then, the inventive airfoil cooling comprising the airfoil counterflow cooling scheme of the cooling channels CMC can be used for turbine vanes TV having only one coolant vane inlet or coolant feed as well.

The spacing between two direct neighbored cooling channels CMC is defined as pitch. The average pitch of all cooling channels located in the leading edge LE and in the suction side wall SSW can be smaller than the average pitch of all cooling channels CMC located in the pressure side wall PSW. Also, the shape of the cooling channels depends on its location. In the suction side wall SSW and/or in the leading edge LE the shape of the cooling channels CMC is either elliptical or of egg-shape, whereas the cooling channels CMC located in the pressure side wall PSW are circular. Both, the local pitch adjustment, and the shape of the cooling channels This arranged enables a locally adapted cooling of the airfoil walls SSW, PSW in accordance with the typical temperature distributed of the airfoil AF that appears during operation, without any over cooling and any under cooling of the walls.

Figure 5:
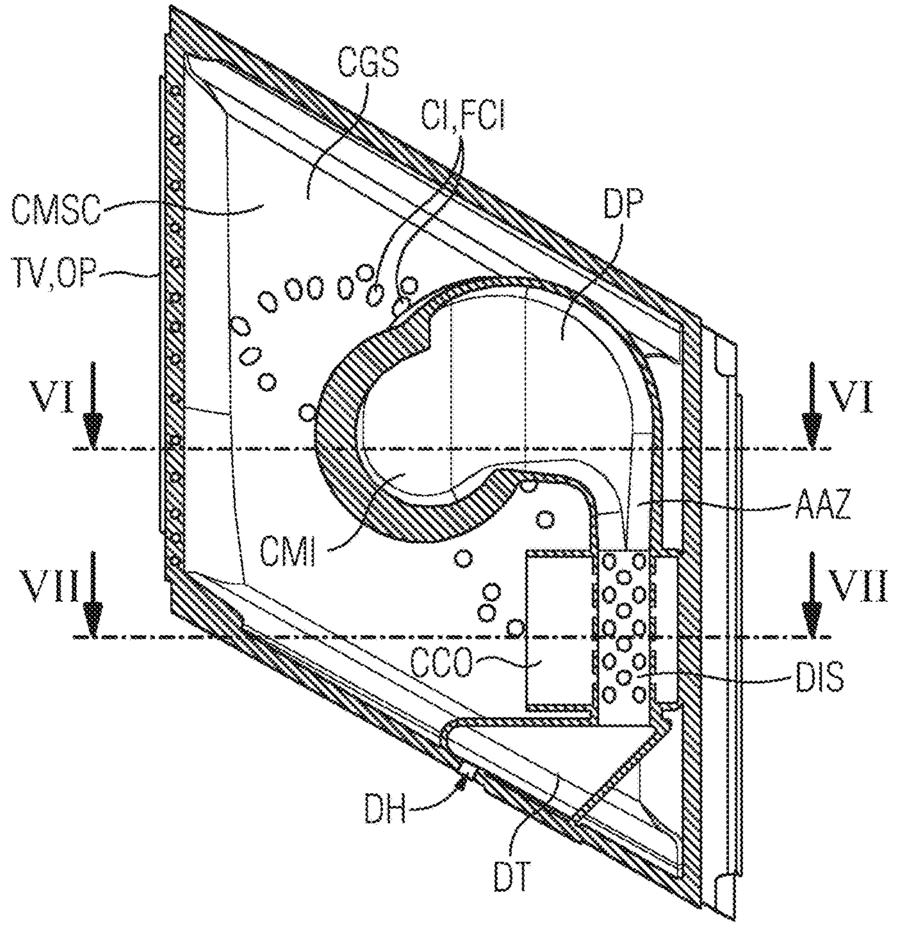
FIGS. 5, 6, and 7 show multiple cross-sectional views through the outer platform of a turbine vane according to a second exemplary embodiment of the invention.
Figure 6:
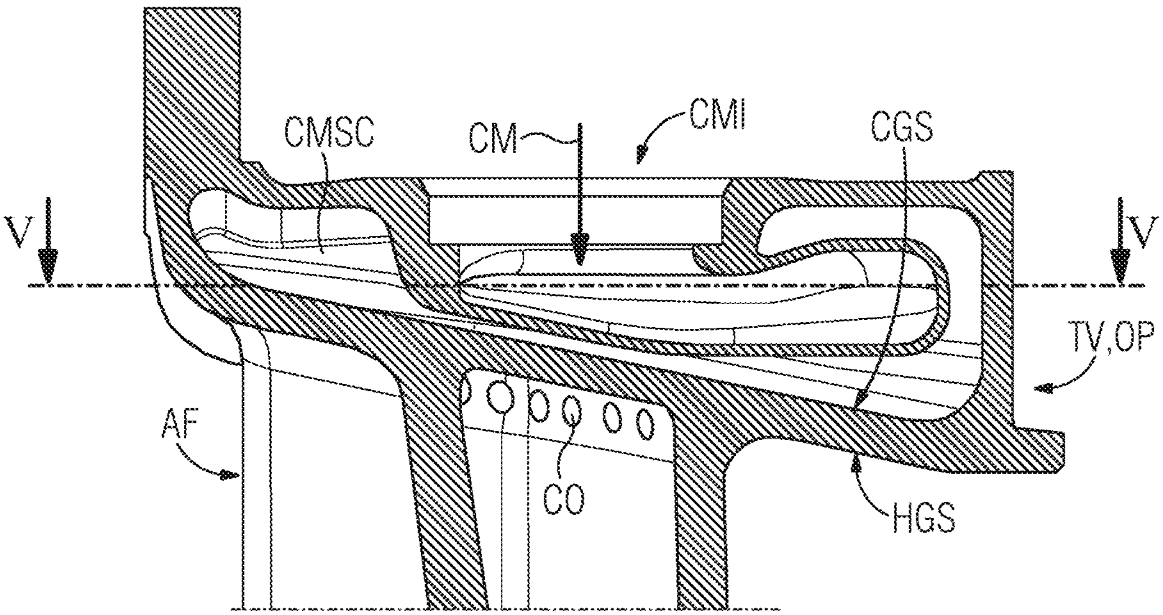
Figure 7:
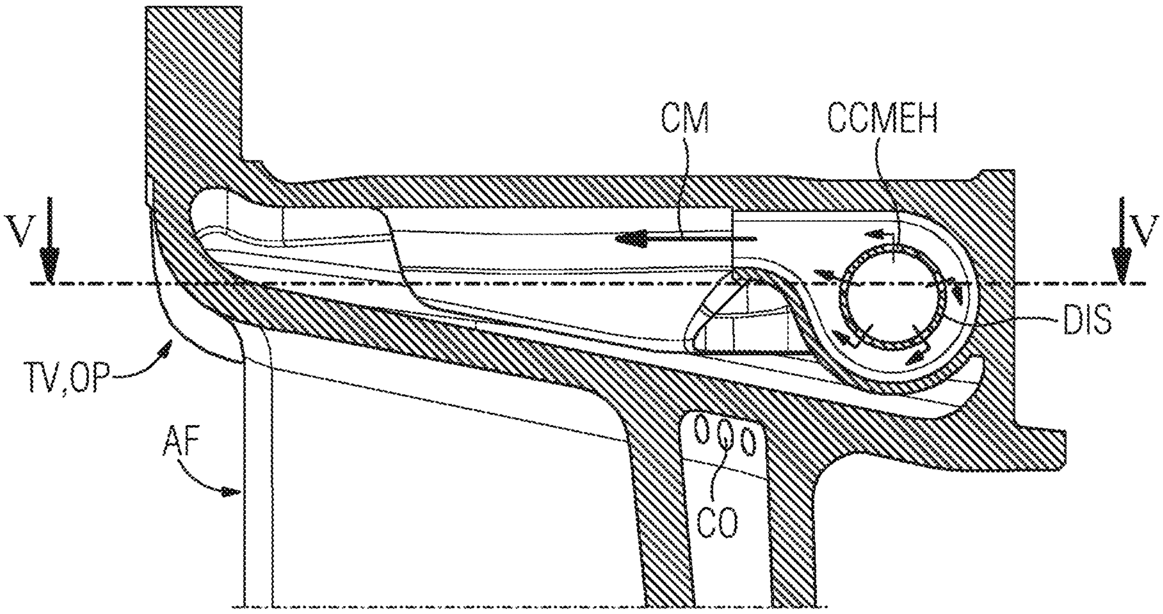

FIGS. 5-7 show in different sectional views the outer platform OP of a turbine vane TV according to a second exemplary embodiment of the invention. To supply cleaner coolant to the cooling channels CMC, i.e., with a smaller number of dust or particles carried by the coolant, e.g., cooling air, a dust precipitator DP is arranged between the coolant vane inlet CMI and the first channel inlets FCI. Preferably, the dust precipitator DP comprises an air acceleration zone AAZ, a dust inertia separator DIS, and a dust trap DT with a dust exit hole DEH. The dust inertia separator DIS is embodied as a pipe with constantly distributed clean coolant exit holes CCMEH and extends in the same direction to which the coolant leaves the air acceleration zone AAZ. While operation the accelerated coolant and its dust and particles flow into and through the pipe. Because of mass and inertia, the coolant can turn direction easier than the dust and particles carried therein. Dust and particles continuously flow straight into the dust trap TD whereas the cleaner coolant turn flow direction and leaves the pipe by through the clean coolant exit holes CCMEH. Cleaner coolant, compared to a turbine vane having no dust precipitator DP, flows to the cooling channels and the risk of blocking or clogging of cooling channels CMC is reduced. This ensures that the ex-pected lifetime of the turbine vane can be achieved.

Figure 8:
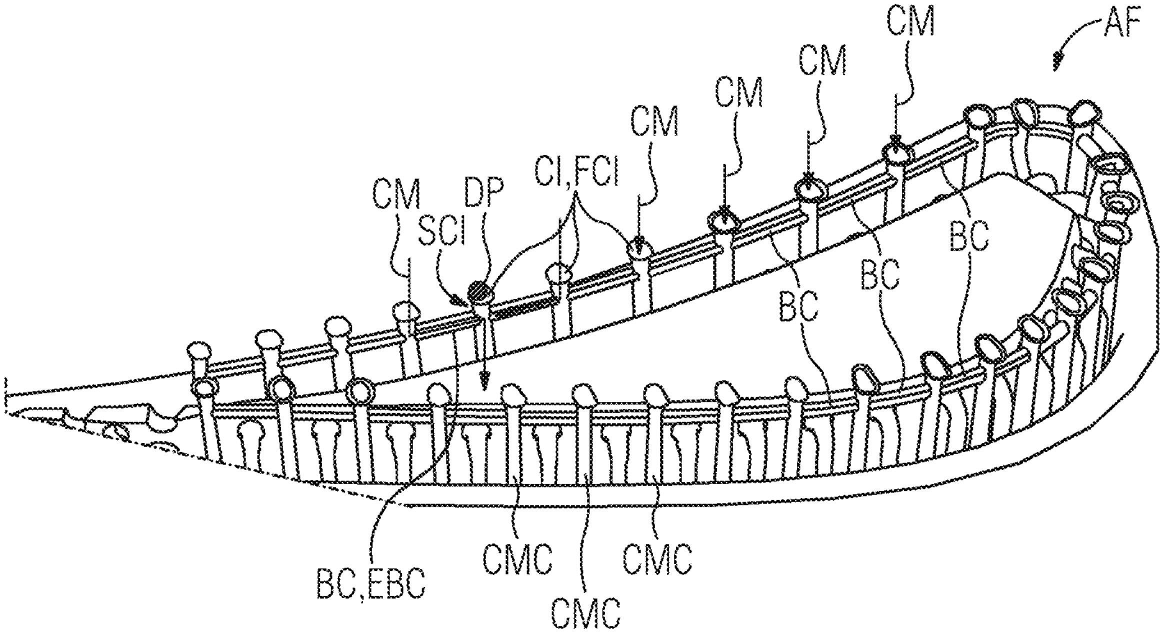
FIG. 8 shows a cross-sectional view through a turbine vane according to another exemplary embodiment of the invention.

FIG. 8 shows in perspective view of the inventive airfoil counterflow cooling scheme of a turbine vane TV according to another exemplary embodiment of the invention. Here, means for reducing the risk result from plugging the cooling channel CMC by particles DP is embedded in the airfoil AF as. In detail a number of bypass passages BC are located in the vicinity of the first channel inlets FCI of cooling channels CMC. In case a first channel inlet FCI is blocked or plugged by a particle DP coolant CM can be feed to the respective cooling channel CMC by two bypass channels as shown. In this case the cooling channel CMC comprises three channel inlets: the first channel inlet FCI represents the first one and the two bypass channels BC represents the second and third channel inlets. Of course, it is possible that contrary to what is shown in FIG. 8, only each second bypass channel BC is provided. In this case the cooling channels (CMC) have only two channel inlets.

The invention claimed is:

1. A turbine vane (TV) for a gas turbine, comprising:

an airfoil (AF) having a suction side wall (SSW) and a pressure side (PSW) wall encompassing at least one central cavity (CC), both walls (SSW, PSW) extending, when the turbine vane (TV) is assembled in a gas turbine, in axial direction (X) of said gas turbine from a leading edge (LE) to a trailing edge (TE) and in radial direction (Y) of said gas turbine from an outer end (OE) of the airfoil (HA) to an inner end (IE) of the airfoil (AF), for guiding a hot gas of the gas turbine;

an outer platform (OP) and an inner platform (IP), each located at the respective end (OE, IE) of the airfoil (AF) and each having a hot gas surface (HGS) facing towards the airfoil (AF) and an internal cold gas surface (CGS) that is opposingly arranged to the hot gas surface (HGS);

a number of cooling channels (CMC) that are arranged in the suction side wall (SSW) and/or the pressure side wall (PSW), the cooling channels (CMC) extends substantially in radial direction (X), wherein each cooling channel (CMC) has at least one channel inlet (CI, FCI) and one channel outlet (CO) through which a coolant (CM) can enter resp, and leave the respective cooling channel (CMC);

wherein the channel inlets (CI, CFI) are in flow connection with at least one coolant supply chamber (CMSC) and the channel outlets (CO) are in flow connection with at least one coolant discharge chamber (CMDC), wherein for the respective cooling channel (CMC) its first channel inlet (FCI) of the at least one channel inlets (CI, FCI) is in flow connection with one the least one coolant supply chamber (CMSC) and its channel outlet (CO) is in flow connection with one of the at least one coolant discharge chamber (CMDS), wherein the first channel inlets (CI, FCI) and the channel outlets (CO) of the number of cooling channels (CMC) are arranged such, that for a substantial number of the cooling channels (CMC), the flow directions of direct adjacent cooling channels (CMC) are opposite, wherein a means is provided for reducing a risk of and/or resulting from plugging the cooling channel (CMC) by particles, in which the means comprises a bypass channel (BC) inside the airfoil (AF) such that the bypass channel (BC) connects fluidly two cooling channels (CMC) having their first channel inlet directly next to each other.

2. The turbine vane (TV) according to claim 1, wherein the at least one coolant supply chamber (CMSC) is partially limited by the internal cold gas surfaces (CGS) of the inner platform (IP) or the outer platform (OP) and the at least one coolant discharge chamber (CMDC) comprises the at least one central cavity (CC).

3. The turbine vane (TV) according claim 1, wherein along the axial direction (X) the first channel inlets (FCI) of each second cooling channel are arranged in the internal cold gas surface (CGS) of the outer platform (OP) and the first channel inlets (FCI) of alternating cooling channels located between two of each second cooling channels are arranged in the internal cold gas surface (CGS) of the inner platform (IP), and wherein the channel outlets (CO) of each second cooling channel are arranged at the inner end (IE) of the airfoil (AF) and the channel outlets (CO) of alternating cooling channels located between two of each second cooling channels are arranged at the outer end (OE) of the airfoil (AF).

4. The turbine vane (TV) according to claim 1, wherein the cooling channels (CMC) located in the suction side wall (SSW) and around the leading edge (LE) are—in cross section—elliptical or egg-shaped with a first average pitch therebetween and the cooling channels (CMC) located in the pressure side wall (PSW) are—in cross section—circular with a second average pitch therebetween, wherein the first average pitch is smaller than the second average pitch.

5. The turbine vane (TV) according to claim 4, wherein a number of the cooling channels (CMC) located in the suction side wall (SSW) is greater than a number of the cooling channels (CMC) located in the pressure side wall (PSW).

6. The turbine vane (TV) according to claim 1, wherein the airfoil (AF) comprises at least one discharge cooling hole (DCH) at or in the trailing edge (TE), and wherein between the at least one coolant discharge chamber (CMDC) and the at least one discharge cooling hole (DCH) an array of cooling pins (ACP) and/or axially extending stiffening ribs (SR) are/is arranged.

7. The turbine vane (TV) according to claim 1, wherein an axial length (AL) of the airfoil (AF) is determined between its leading edge (LE) and trailing edge (TE), and wherein the airfoil (AF) is free of film cooling holes in at least 85% of its axial length starting from its leading edge (LE).

8. The turbine vane (TV) according to claim 1, wherein the inner platform (IP) and/or the outer platform (OP) each encompassing the respective coolant supply chamber (CMSC).

9. The turbine vane (TV) according to claim 1, wherein the turbine vane (TV) is monolithic.

10. The turbine vane (TV) according to claim 1, wherein a separation wall (SW) separates the coolant discharge chamber (CMDC) from the coolant supply chamber (CMSC).

11. The turbine vane (TV) according to claim 10, wherein the means is comprises a dust precipitator (DP), which is arranged in the inner platform (IP) and/or the outer platform (OP).

12. The turbine vane (TV) according to claim 11, wherein the dust precipitator (DP) comprises an air acceleration zone (AAZ), a dust inertia separator (DIS), and a dust trap (DT) with a dust exit hole (DEH).

13. The turbine vane (TV) according to claim 12, wherein the dust inertia separator (DIS) comprises a pipe with multiple clean coolant exit holes (CCMEH) and extending in the same direction to which the coolant leaves the air acceleration zone (AAZ).

* * * * *